T. B. JONES.
Grain-Drill.
No. 388, 31,392.
Patented Feb. 12. 1861.
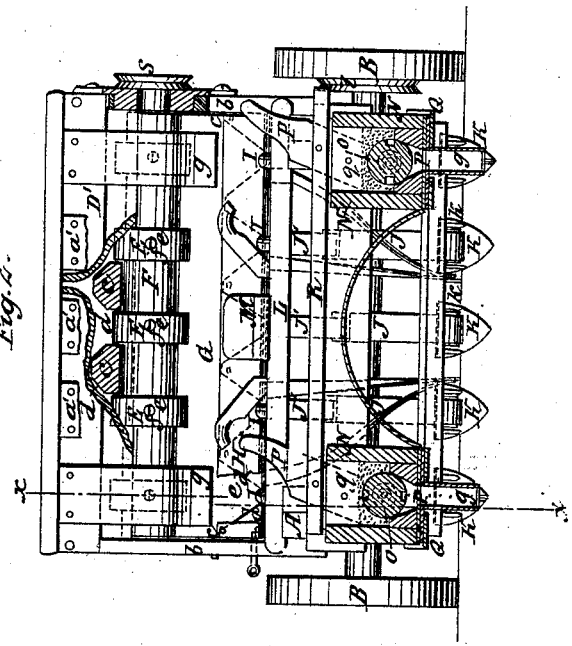
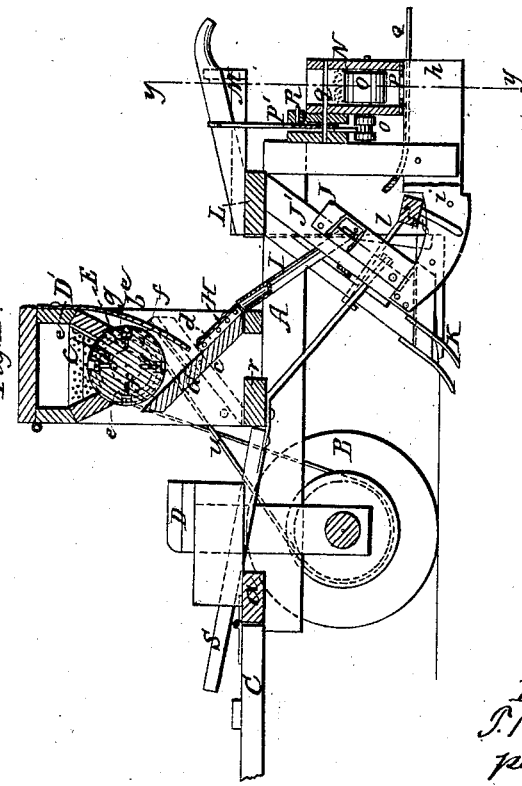
Witnesses.
J. W. Coombs.
R. S. Spencer
Inventor.
T. B. Jones
per Munn & Co
Attys.

UNITED STATES PATENT OFFICE.

T. B. JONES, OF EARLVILLE, ILLINOIS.

IMPROVEMENT IN SEEDING-MACHINES.

Specification forming part of Letters Patent No. 31,392, dated February 12, 1861.

*To all whom it may concern:*

Be it known that I, T. B. JONES, of Earlville, in the county of La Salle and State of Illinois, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a back sectional view of same, taken in the line $y\ y$, Fig. 1.

Similar letters of reference indicate corresponding parts in the two figures.

This invention has for its object the obtaining of a machine which may be used for sowing seed, either broadcast, in drills, or check-rows, as may be desired, and one that will operate in any of the above-named ways, as well as machines made separately for each.

To enable those skilled in the art to fully understand and construct my invention, I will proceed to describe it.

A represents a rectangular frame, the front part of which is mounted on wheels B B.

C is the draft-pole attached to the center of the front cross-rail, $a$, of the machine, and D is the driver's seat just back of the front cross-rail, $a$, as shown in Fig. 1.

To each side of the frame A there is secured an upright, $b$, and between the upper parts of these uprights a seed box or hopper, D′, is placed. The seed box or hopper is divided by partitions $c$ into several compartments, $d$, and the lower ends of the partitions fit between wheels E, which are placed on a shaft, F, said shaft being directly beneath the seed box or hopper and running longitudinally with it. The peripheries of the wheels E form the bottoms of the seed box or hopper D′, and in each wheel E there are made radial holes $e$ to form seed cells or cups, the capacity of which may be regulated as desired by means of screws $f$, the heads of which form the bottom of the cells or cups, and which by turning the screws may be brought nearer to or farther from the peripheries of the wheels, as may be desired.

To one side of the seed box or hopper D′ there are attached a series of elastic plates, $g$. These plates are slightly curved, and they project toward a vertical plane which passes through the center of the shaft F.

Between the two uprights $b\ b$ there is placed a plate, G, which is suspended on pivots $c$, said pivots passing centrally into the ends of the plate. This plate G, by being thus arranged, may be adjusted in either of two positions, as shown in Fig. 1, one position being in red, and the seed from the wheels E may consequently be thrown either in front or behind the shaft F.

To the plate G there is attached a plate, H, and V-shaped partitions $d$ are placed between the plates G H to form seed-conveying passages $e$, which, when the plate G is adjusted, as shown in tint or color in Fig. 1, are in line with tubes I, which are in communication with tubes J, attached to bars J′, the lower ends of which bars have shares or teeth K attached, the upper ends of said tubes being secured to a cross-bar, L, on the frame A, as shown clearly in Fig. 1.

On the bar L there is placed a seat, M, on which an operator places himself when the machine is used for planting in check-rows, and to the back part of the frame there are secured two seed-boxes, N N, one at each side.

In each seed-box N there is placed a cylinder, O, and these cylinders have each two seed-cells, $f\ f$, made in them at opposite points of their axes, as shown clearly in Fig. 2. The cylinders O O are directly over apertures P P in the bottoms of the seed-boxes N, said apertures being in line with spaces $g$ between vertical plates $h\ h$, attached to the seed-boxes.

To the under side of the seed-boxes N N there are attached horizontal plates Q, which serve as coverers, the plates $h\ h$ serving as furrow-openers.

The plates $h\ h$ of each seed-box are connected together in front to a runner-shaped plate, $i$, as shown in Fig. 1. On these runner-shaped plates $i\ i$ a bar, $j$, rests, said bar having teeth $k$ attached to it to form a harrow or pulverizer. The bar $j$ is connected by rods $l$ to braces $m$ at each side of the machine.

To the front ends of the axes $n$ of the cylinders O there are attached pinions $o\ o$, one to each axis, and into the pinions $o\ o$ toothed segments $p$ gear, the segments being at the lower ends of levers P′, which work on fulcrum-rods $q$ at the front sides of the seed-boxes N. (See Fig. 1.) The levers P P are connected by a bar, R.

To a center cross-bar, $r$, of the frame A there is attached a bar, S, which extends forward underneath the driver's seat D and over the front cross-rail, a, of the frame A, as shown in Fig. 1.

The shaft F has a pulley, s, at one end of it, and a pulley, t, is attached to the inner side of one of the wheels B. A cross-belt, u, passes around these two pulleys, as shown in Fig. 1.

The operation of the machine is as follows: When it is desired to sow seed in a broadcast manner the seed-box D' is supplied with seed, and the plate G is adjusted, as shown in red, Fig. 1. By this arrangement the seed is distributed from the box D' by the cells e, and, striking the plate G, pass down in front of the shaft F and strike the ground in a scattered broadcast manner. The elastic plates g serve to direct the seed properly to the plate G. When it is desired to sow the seed in drills the plate G is turned in the position as shown in tint or color in Fig. 1, and the seed, as it strikes the plate G, passes into the passage e, and thence into the tubes I and J, and drops into the furrows made by the shares or teeth K, the seed being covered by any proper covering devices. When it is desired to sow seed in check-rows the seed-boxes N are supplied with seed, and the operator on seat M vibrates one of the levers P' back and forth, and the segment p and pinion o will communicate a reciprocating partially rotating movement to the cylinder O, to which said lever is connected, a similar motion being communicated to the other cylinder O through the medium of the connecting-bar R, which connects the two levers P'. The seed is distributed from the boxes N by the cells $f f$ in the cylinders O O. The seed-box D' is provided with cut-off flaps a', one for each wheel E, and at any time the driver may elevate the back part of the machine to assist it in turning by stepping out on the bar S.

Thus it will be seen that the machine may be used for planting seed in three different ways, and that the desired result is attained by a very simple means.

Having thus described my invention, what I claim as new, and desire to secure by Letters Patent, is—

The employment or use of the pivoted or adjustable plate G in connection with the elastic plates g, wheels E, seed box or hopper D', tubes I J, and passages e, arranged substantially as and for the purpose set forth.

T. B. JONES.

Witnesses:
HENRY A. CHASE,
DAVIS B. STILSON.